United States Patent [19]

Thein et al.

[11] Patent Number: 4,885,317

[45] Date of Patent: Dec. 5, 1989

[54] PRESS FORMING PROCESS AND APPARATUS FOR PLASTIC FOAM AND PLASTIC FOAM PRODUCT

[75] Inventors: Joe K. Thein, Torrance; Flerida B. Uldrich, Westminster, both of Calif.

[73] Assignee: Northrop Corporation, Hawthorne, Calif.

[21] Appl. No.: 222,651

[22] Filed: Jul. 21, 1988

[51] Int. Cl.$^4$ .................. B29C 67/22; B29C 51/08; B29C 53/04

[52] U.S. Cl. .................... 521/149; 264/285; 264/313; 264/316; 264/321; 264/322; 264/DIG. 65; 264/DIG. 66; 425/340; 425/364 R; 425/367; 425/373; 425/DIG. 39; 425/DIG. 131; 428/71; 521/79

[58] Field of Search .............. 264/292, 313, 316, 321, 264/285, 322, DIG. 65, DIG. 66; 425/340, 364 R, 367, 373, DIG. 39, DIG. 131; 428/71; 521/149, 79

[56] References Cited

U.S. PATENT DOCUMENTS

| | | | |
|---|---|---|---|
| 2,357,806 | 9/1944 | Borkland | 264/313 X |
| 2,406,843 | 9/1946 | Luth et al. | 264/292 X |
| 2,458,864 | 1/1949 | Lindsay | 264/313 X |
| 2,565,949 | 8/1951 | Clifford et al. | 264/313 X |
| 2,613,398 | 10/1952 | Crowell | 264/316 X |
| 2,962,767 | 12/1960 | Trojanowski et al. | 264/313 |
| 3,246,443 | 4/1966 | Slemmons | 264/321 X |
| 3,458,608 | 7/1969 | Russell et al. | 264/46.2 X |
| 3,546,221 | 12/1970 | Johnson | 264/313 X |
| 3,557,277 | 1/1971 | Brodersen et al. | 264/316 |
| 3,948,710 | 4/1976 | Harvey | 264/321 X |
| 3,988,191 | 10/1976 | Matsui | 264/321 X |
| 4,034,054 | 7/1977 | Sauer | 264/313 |
| 4,222,808 | 9/1980 | Hale et al. | 264/316 X |
| 4,330,247 | 5/1982 | Folschweiler | 264/316 X |
| 4,576,776 | 3/1986 | Anderson | 264/316 X |
| 4,759,815 | 7/1988 | Frey | 264/322 |
| 4,826,420 | 5/1989 | Frey | 264/322 |

FOREIGN PATENT DOCUMENTS

| | | | |
|---|---|---|---|
| 68696 | 5/1915 | Austria | 264/316 |
| 58-12730 | 1/1983 | Japan . | |
| 1319587 | 6/1973 | United Kingdom | 264/313 |

*Primary Examiner*—Philip Anderson
*Attorney, Agent, or Firm*—Terry J. Anderson; Robert B. Block

[57] ABSTRACT

Polymerized foam material in flat billet form is enclosed in a heat-retaining envelope and heated to forming temperature then promptly loaded into an innovative unheated forming press and accurately formed before cooling below forming temperature. The heat-retaining envelope has an expansive skin on one side and a contractive skin on the other side to facilitate bending without wrinkling or other distortion. The forming press utilizes a rigid male form punch and a spring-tensioned elastic belt, supported on a pair of variably-spaced rollers, initially presenting a flat compliant surface upon which the heated workpiece is placed. Pressure from the form punch progressively deflects the workpiece and the belt, which becomes a compliant mold member conforming itself and the workpiece progressively around the form punch to yield an article of required carved shape, free of wrinkles or tool creep distortions.

5 Claims, 2 Drawing Sheets

PRESS FORMING PROCESS AND APPARATUS FOR PLASTIC FOAM AND PLASTIC FOAM PRODUCT

FIELD OF THE INVENTION

This invention relates to the field of manufacturing structural articles from rigid foam material. More particularly it relates to an innovative method of forming flat billets of polymerized foam material in a unique roller/punch press mechanism to produce curve-shaped high-performance articles of aircraft structural quality.

BACKGROUND OF THE INVENTION PRIOR ART

Articles requiring high strength/weight ratio, such as aircraft structural parts, are commonly fabricated from polymerized foam material such as polymethacrylimide which has the commercial trade name Rohacell WF Rigid Foam. Such material is rigid at room temperature and is commercially available only in the form of orthogonal billets. At elevated temperature the material softens and may be reshaped by forming tools; however the thermal characteristics of this type of foam material makes it difficult to form into contoured parts because (a) being a good insulator of heat, it has a very narrow range of forming temperature, and (b) lack of heat retention causes the material temperature to drop rapidly below forming temperature when a workpiece is removed from the heating oven. For these reasons, prior to this invention, it has been necessary to heat both the forming tool and the foam workpiece to the forming temperature, and there was a tendency for material to creep from the weight of the tool; consequently forming was both costly and dimensionally inaccurate.

Prior art attempts at forming workpieces include the method detailed in U.S. Pat. No. 3,458,608 to Russell et al relating to a process of sequential partial expansions, compressing a shaped solid plastic workpiece, steeped in a gas-producing foam agent, between a flexible male membrane plunger and a rigid female mold.

U.S. Pat. No. 3,988,191 to Matsui shows methods and equipment for pressing foam thermoplastic workpieces between a rigid male plunger and a rigid female mold to form two halves, which are then welded together to form a vessel.

U.S. Pat. No. 3,948,710 to Harvey shows a method for forming a foam sandwich structure whose skins consist of paper layers, in a three-bar-roller forming mechanism; and, U.S. Pat. No. 3,041,660 to Fink shows a heated-die method for curing an elongated raw mass of thick liquid thermosetting resin which has been preformed into a rod-like shape and enveloped in a thin release film, to produce a solid rod.

Japanese Pat. No. 58-12730 discloses a method for putting a bend in a thin, flat sandwich structure by pressing it between a rigid male plug and a rigid female mold.

Unlike these prior art patents, the present invention utilizes a unique compliant female mold comprising an elastomeric belt stretched over a pair of variably-spaced sliding rollers adapted to dynamically and progressively conform to the shape of a rigid male plunger in the forming process, and encloses the foam workpiece in a heat-retaining envelope to allow forming in an unheated press. The present invention does not require application of paper skins, moistening of one skin or passing through a three-bar-roller forming mechanism, and does not produce wrinkles in the sandwich structure. Moreover, the present invention does not require the forming mechanism to supply heat to the workpiece.

According to the techniques of the invention, there is provided a method and apparatus for press forming an article of a required shape from a flat workpiece of structural foam material. According to the method, a flat workpiece of foam material is heated to a forming temperature and then supported by a compliant female mold member which is initially stretched flat. A male mold member is advanced against said heated workpiece and against the resistance of said compliant female mold member to form said workpiece to the desired shape. In a preferred form of the invention, the male mold member is held against said workpiece until the workpiece cools and hardens as the article of the desired shape.

According to the apparatus aspect of the invention, there is provided a forming press for shaping an article of required shape from a flat workpiece of foam including a rigid male forming punch defining the inside shape and dimensions of said article. A compliant female mold member initially stretched flat is provided to be disposed below the workpiece. Means are provided to lower the male mold member against the workpiece and against the resistance of the compliant female mold member so that the workpiece is progressively wrapped around said male mold member thus forming the workpiece to the required shape.

In a preferred form of the invention, the workpiece is first enclosed within a heat retaining envelope and heated to a forming temperature. The heat retaining envelope remains on the workpiece throughout the forming steps.

According to preferred techniques of the invention, the compliant female mold member is supported by roller means adapted to slide apart during the descending of the male mold member to compress the workpiece inwardly around said male mold member to retain the shape of such member and to prevent spring back action of the workpiece. In a further preferred form of the invention, elastic padding and adjustable tension springs are utilized to reduce crushing of the heated workpiece at high temperature and to maintain uniformed thickness of the workpiece.

It was an object of this invention to provide a method of forming heated foam which does not require the heating of the forming tools.

It was a further object of this invention to fabricate complicated shape of structural foam materials to correct dimensions.

It was a further object of this invention to produce shaped structural foam articles that had desired contours and were free of processing or tooling marks.

These and other objects of the invention will be apparent from the accompanying drawings and the description thereof which describe a preferred embodiment of the invention.

BRIEF DESCRIPTION OF THE DRAWINGS

In FIGS. 2-6, the strippling for indicating foamed polymeric material has been omitted for clarity of illustration.

DETAILED DESCRIPTION

Figure 1:
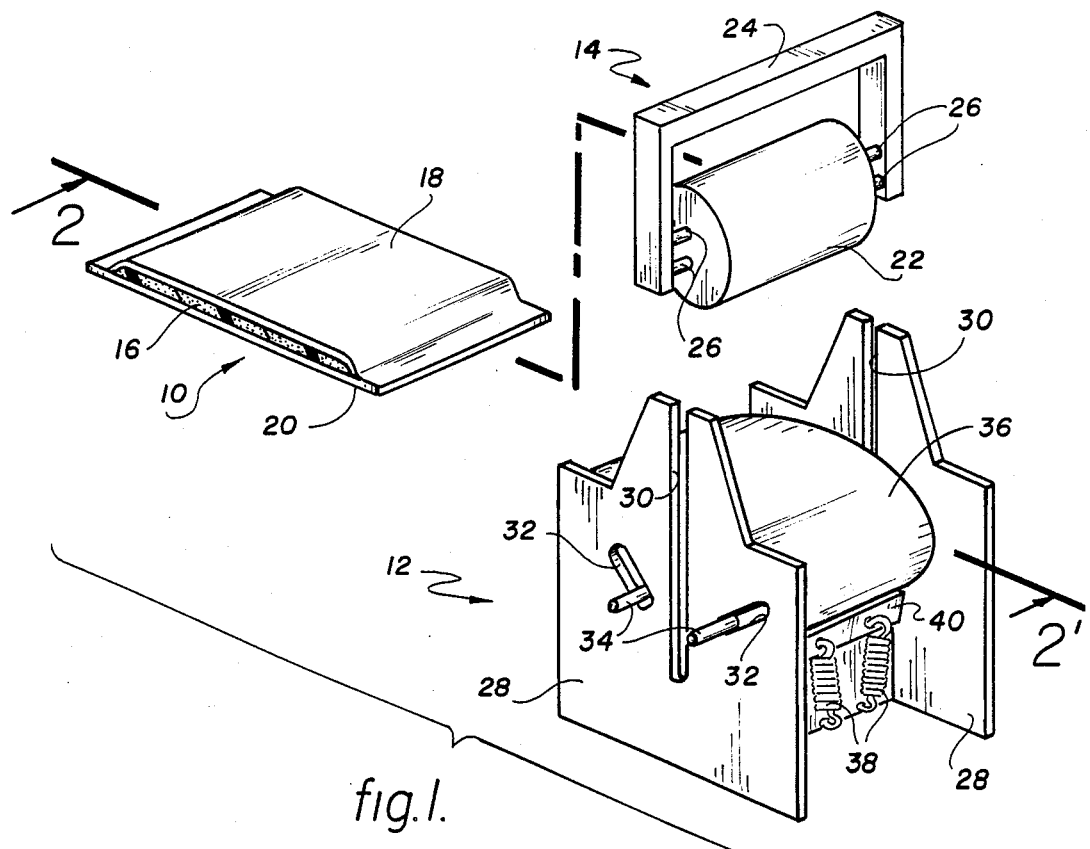
FIG. 1 is a perspective view of a forming press having a tensioned elastomeric belt and a suspended plunger assembly, shown disengaged, fitted with a cylindrical form punch. Also shown is a flat foam workpiece enclosed in a heat-retaining envelope ready to be formed into a curved shape in accordance with this invention.

Referring now to the drawings, FIG. 1 is a perspective view showing a prepared workpiece 10 and a forming punch press 12 including plunger assembly 14 shown separately suspended above the main body of press 12. The workpiece 10 comprises a flat orthogonally-shaped core 16, of rigid foam such as polymethacrylimide (Rohacell WF). Since the foam material alone has very low heat retention, it is prepared, according to a preferred technique of the invention, for forming by enclosing it within a heat-retaining envelope having a top skin 18 of contractible material such as woven fiberglass and a bottom skin 20 of high temperature elastic material such as silicone rubber. Double-backed pressure sensitive tape or other fastening agents may be used to hold the skins 18 and 20 to the foam core 16 in preparation for forming.

Plunger assembly 14 includes a form punch 22 fastened non-rotatably to a frame 24 by pins 26, protruding at each end of form punch 22, disposed in a vertical plane, spacing the arms of the frame 24 apart from the ends of form punch 22 as shown.

The main body of the press 12 comprises a pair of sidewalls 28 which may be made from plywood, each sidewall 28 having a vertical slot 30, open at the top, and a pair of closed-end inclined slots 32 as shown.

A pair of roller shafts 34, seen extending through slots 32, each carry a roller (not visible). An elastomeric belt 36, which may be a rubber sheet, rides on the rollers and is held under tension by coil springs 38 which are hooked onto belt-end plates 40 at the ends of belt 36.

Plunger assembly 14 is suspended from above so that it can be lowered into the main body of press 12, guided by pins 26 engaging slots 30.

Figure 2:
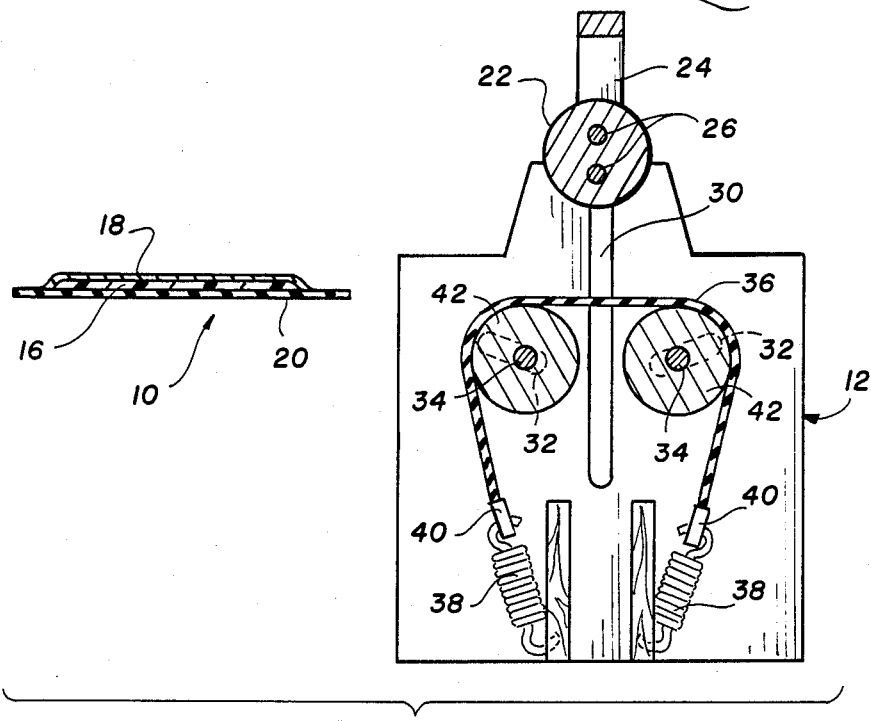
FIG. 2 is a cross-section of the items in FIG. 1, taken through 2-2' showing a pair of rollers supporting the elastomeric belt, and showing the plunger assembly lowered from its FIG. 1 position to partially engage vertical guidance slots in the press sidewalls.

FIG. 2 is a cross-sectional view of the items of FIG. 1 showing rollers 42, and showing plunger assembly 14 partially lowered into the main body of press 12. At this stage of the process, the enveloped workpiece 10 is preheated in an oven to its forming temperature, which is about 404° F. for one grade of polymethacrylimide foam. The plunger assembly 14 is lowered to place form punch 22 in a ready position immediately above the flat region of belt 36. Since the forming temperature range for the foam material is quite narrow, workpiece 10 must be quickly removed from the oven, placed on belt 36 and then formed quickly, before it cools below its forming temperature.

Figure 3:
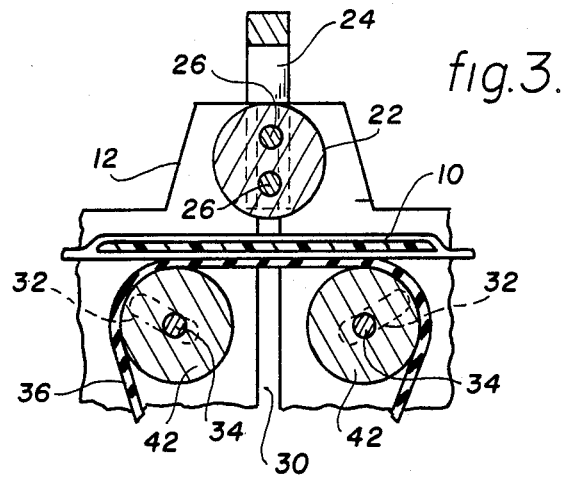
FIG. 3 through FIG. 6 show an elementary cross-section of the two rollers, the belt and the form punch of the press of FIG. 1 and FIG. 2, acting upon the workpiece in progressive stages of the forming process of this invention.

In FIG. 3 the heated workpiece 10 is shown laid on the flat surface of belt 36: spring tension applied to belt 36 holds rollers 42 toward each other with shafts 34 toward the inward ends of slots 32. Form punch 22 has been lowered to a position immediately above workpiece 10.

Figure 4:
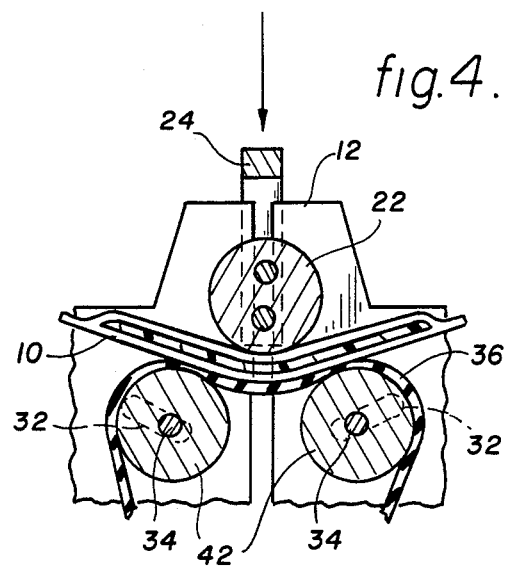

In FIG. 4 plunger assembly 22 is shown lowered still further, with downward pressure applied via frame 24 to form punch 22 deflecting the heated, softened workpiece 10 along with belt 36 as shown, initiating the bending action.

Figure 5:
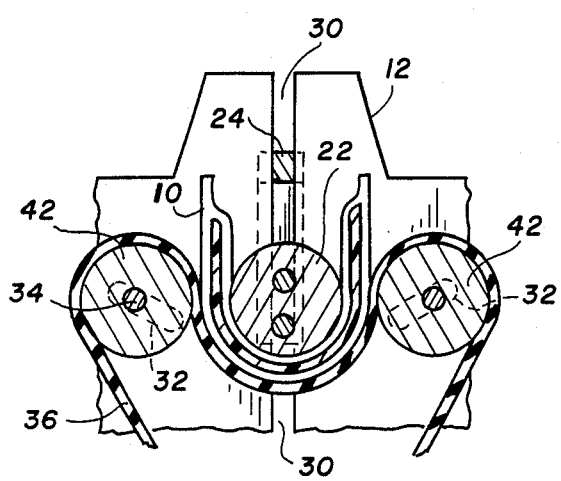

FIG. 5 shows plunger assembly 14 pressed downward still further, to where form punch 22 has moved down to the same level as rollers 42, spreading them apart so that shafts 34 have moved toward the outer ends of slots 36. At this stage workpiece 10 has been formed to practically a semicircle, which has required the outer skin of the heat-retaining envelope to expand and the inner skin to contract.

Figure 6:
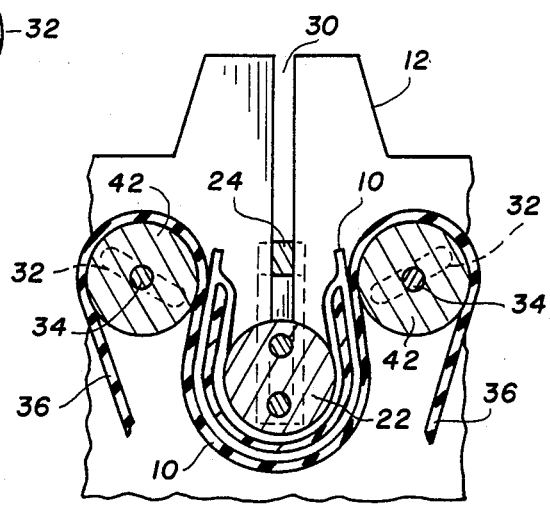

Plunger assembly 14 shown in FIG. 6, is pressed even further downward, to where form punch 22 has been pressed down somewhat below the level of rollers 42, which have now moved back slightly toward each other, and workpiece 10 is formed somewhat beyond a semicircle, to allow for a small amount of spring back. The workpiece 10 is held in this position until it cools to about 200 degrees F., where it takes a permanent set in its formed shape, and once again becomes rigid. Then plunger assembly 14 is hoisted upward to allow the formed workpiece 10 to be removed from the forming press and stripped of envelope skins 18 and 20.

Figure 7:
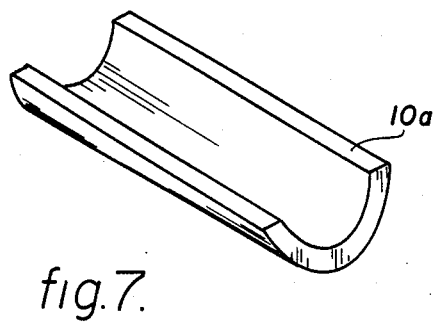
FIG. 7 is a perspective view of the curved finished workpiece yielded by the forming process of this invention.

FIG. 7 shows the final workpiece 10a after excess end material has been cut away to yield the required rigid semi-cylindrical wall form shown.

The use of the compliant belt as the female mold member, and the slotted mounting of rollers 42 serve to distribute pressure evenly during bending, thus avoiding crushing or wrinkling of the foam material.

The press 12 has been shown in FIG. 1 in basic form to best illustrate its essential elements. There are certain refinements which, while not essential to basic operation, could enhance the mechanism's durability; for example, slots 30 and 32 may be reinforced against wear by bolting angle iron brackets along their edges on sidewalls 28, and the entire press 12 may be mounted on a platform or baseplate and braced by gussets, cross-members and the like.

The tension provided by springs 38 may be increased by placing additional springs in parallel with those shown: for this purpose spare fastening points may be provided on belt end plates 40 and the main body of press 12.

The method of forming rigid foam articles taught by this invention is not limited to the walled semi-cylindrical shape shown in FIG. 7 as an illustrative example: the form punch 22 may be contoured along its length, for example in a barrel shape, and the rollers 42 contoured in a corresponding complementary shape, to produce articles curved along both axes.

Articles shaped to a semi-circular cross-section such as the example in FIG. 7 may be mated together in pairs to obtain a full circular cross-section, however parts requiring only a partial bend are readily formed by limiting the travel of plunger assembly 14; for example the forming could be stopped at the position shown in FIG. 4.

Form punch 22 may be shaped other than circular in cross-section, depending on the shape of the required article; for example it could be made elliptical. Rollers 42 are normally made circular in cross-section to avoid complications, however other shapes may be viable.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed is:

1. A method of press-forming an article of required shape from a flat workpiece of thermoplastic foam material comprising the steps of:
   providing a heat retaining envelope having upper and lower skins,
   said upper skin being contractive without wrinkling,
   said lower skin being expansive without wrinkling,
   enclosing said workpiece within said heat-retaining envelope,
   heating said envelope workpiece to temperature;
   transferring said heated enveloped workpiece to an unheated forming press adapted to form said workpiece to the required shape before it cools below its forming temperature,
   actuating said forming press to shape the enveloped article and holding said workpiece formed therein until it cools and hardens as the article of required shape without wrinkles,
   removing the enveloped article from said press, and removing said article from said envelope.

2. The method as in claim 1 in which said actuating and holding steps including
   supporting said enveloped workpiece with a compliant female member initially stretched flat,
   advancing a male mold member against said enveloped workpiece and against the resistance of said female mold member to form said enveloped workpiece, and
   holding said male mold member against said formed workpiece until said workpiece cools and hardens.

3. The article resulting from the method of claim 1.

4. A forming press for shaping an article of required shape from a flat workpiece of thermoplastic foam, comprising:
   a frame,
   a compliant female mold member,
   a rigid male form punch defining the inside shape and dimensions of said article,
   a pair of rollers disposed side by side in said frame, said rollers having at each end extended central shafts supported in slots provided in said frame,
   an elastomeric belt serving as a compliant forming surface of said female mold member and disposed across the top side of each of said rollers and wrapping partially around each of said rollers and extending downward from each of their outward sides,
   said compliant female mold member being initially stretched flat, disposed and supported by said rollers such that the workpiece, when heated above its forming temperature and placed thereon, may be deflected along with the compliant mold member by pressure from the form punch so as to urge said workpiece to progressively wrap itself around said form punch, thus forming said workpiece to the required shape.

5. A forming press for shaping an article of required shape from a flat workpiece of thermoplastic foam, comprising:
   an elastomeric belt, serving as the forming surface of said compliant female mold member, disposed across the top side of each of said rollers and wrapping partially around each of said rollers and extending downward from each of their outward sides,
   said compliant female mold member initially stretched flat, disposed and supported by said rollers such that the workpiece, when heated above its forming temperature and placed thereon, may be deflected along with the compliant mold member by pressure from the form punch so as to urge said workpiece to progressively wrap itself around said form punch, thus forming said workpiece to the required shape,
   a rigid male form punch defining the inside shape and dimensions of said article, and
   a pair of rollers disposed side by side in said frame, said rollers having at each end extended central shafts supported in inclined slots located in said sidewalls,
   spring fastening means disposed at each end of said belt,
   a plurality of coil springs attached between said spring fastening means and corresponding attachment means located on the main frame of said forming press so as to hold said belt in tension, urging it against said rollers,
   a plunger assembly comprising a form punch shaped in accordance with the required shape of the article to be formed,
   guidance means on said plunger assembly and on said sidewalls allowing said form punch to move vertically while constraining it horizontally, midway between said rollers,
   hoisting means enabling said plunger assembly to be raised so as to lift said form punch clear of said belt, and
   pressure means capable of acting downwardly on said plunger assembly so as to urge said form punch against said belt,
   wherein said inclined slots are sized and positioned to allow said rollers to separate sufficiently to allow said form punch to be forced downward between the rollers, as permitted by flexure of said belt and extension of said springs whereby, said workpiece, when placed within a special heat-retaining envelope and heated to forming temperature in an oven, may then be placed on said belt, and then formed by pressing said form punch downward so as to urge said enveloped workpiece against said belt and deflect them downward together in a forming action which progresses uniformly while the heat-retaining envelope holds the workpiece above its forming temperature until the form punch has been pressed downward to a final position between said rollers; whereby said workpiece becomes formed to the required shape, and hardens in the required shape upon cooling.

* * * * *